Patented Aug. 8, 1950

2,517,577

UNITED STATES PATENT OFFICE 2,517,577

PREPARATION OF CARBOXYALKYL ETHERS OF CELLULOSE

Eugene D. Klug and John S. Tinsley, Wilmington, Del., assignors to Hercules Powder Company, Wilmington, Del., a corporation of Delaware No Drawing. Application December 10, 1946, Serial No. 715,340

9 Claims. (Cl. 260—231)

This invention relates to a process for the preparation of carboxyalkyl ethers of cellulose and, more particularly, to an improvement in the medium of reaction for such preparation. Carboxyalkyl ethers, such as carboxymethylcellulose, are in general prepared by reacting cellulose with a carboxyalkyl etherifying agent, usually a halogenated lower fatty acid or salt thereof, in the presence of free alkali and water. Where the reaction proceeds to the formation of a product of substitution in excess of 0.4 hydroxyl group per anhydroglucose unit of cellulose, the initially heterogeneous mixture becomes a heavy dough because of the solubility of the carboxyalkyl ethers in the aqueous alkali present.

The dough formed in the ordinary reaction is difficult to agitate and is difficult to process at the end of the reaction. The reaction product contains occluded salt and other impurities. It is necessary to precipitate the product from the dough and then to treat the precipitate extensively to remove these impurities.

Now, in accordance with this invention, the difficulties hereinabove mentioned are overcome by reacting cellulose in the presence of free alkali with a carboxyalkylating agent in a medium comprising sufficient isopropyl alcohol or tert-butyl alcohol to maintain the carboxyalkyl cellulose formed, in the solid, suspended state throughout the entire reaction. The desired product is then readily recovered merely by draining off or centrifuging off the liquid medium and washing the solid product to remove impurities. The difficult precipitation step necessitated in prior art processes is not required nor used since the product is in substantially the same physical state as the cellulose used as a starting material. Thus, in the ordinary case, where fibrous cellulose is used, the product will likewise be fibrous. Such a product is very easy to purify and is in a highly desirable form for use.

The invention will be illustrated by typical examples of the preparation of carboxymethylcellulose, which is representative of cellulose carboxyalkyl ethers generally. All parts are by weight unless otherwise specified.

EXAMPLE 1

Sheets of chemically purified cotton linters of a medium viscosity type were shredded. Fifty parts of this shredded cellulose was then suspended in 789 parts of tert-butyl alcohol. The resulting slurry was vigorously stirred while 208.3 parts of a 30% aqueous solution of sodium hydroxide was added over a period of one-half hour at a temperature varying from 28° to 32° C. during the addition. Agitation was continued for one-half hour, during which time the temperature of the reaction mass was gradually reduced to 17° C. Seventy-three parts of solid monochloracetic acid was then added over a period of one-half hour at a temperature rising to 21° C. during this time. The reaction mixture so obtained was then heated to 55° C. in one and one-half hours and kept at 55° C. for four additional hours, agitation being continued throughout the reaction. The reaction product at this point was fibrous and similar in appearance to the original shredded sheet linters. The reaction medium was then drained from the fibers. The fibrous product was then stirred in 70% methanol (30% water) and neutralized, while in suspension, with the acetic acid. The neutralized product was then drained and washed with additional 70% methanol, dehydrated with anhydrous methanol, and dried in air at 70° C. The final product had a substitution of 0.88 and was readily soluble in water. (Substitution herein refers to the average number of hydroxyls present per anhydroglucose unit of cellulose which have been substituted in the reaction, a substitution of 3 representing complete substitution of the cellulose.)

EXAMPLES 2–4

In these examples, isopropyl alcohol was utilized as the nonsolvent reaction medium. The general procedure was similar to that of Example 1, but the concentration of the aqueous sodium hydroxide added to the suspension of cellulose in isopropyl alcohol was varied to illustrate how products of various substitution are readily obtained as desired by the process according to the present invention. In each case, 30 parts of shredded sheet purified linters was suspended in the indicated parts of isopropyl alcohol. One hundred per cent isopropyl alcohol was used in Example 2 and 87% isopropyl alcohol in Examples 3 and 4. Thirty parts by weight (on the dry basis) of sodium hydroxide was then added in each case in the form of an aqueous solution of the concentration indicated in Table I, the percentage figures given representing the concentration of the sodium hydroxide before the addition of the monochloracetic acid and taking into account the water which was present in the isopropyl alcohol. This addition was made over a period of one-half hour with agitation. Thirty-five parts of chloracetic acid was then added over an additional period of one-half hour. The reaction in each case was completed and the product recovered in the manner of Example 1. The products varied in substitution as given in Table I.

*Table I*

| Example | Parts of Isopropyl Alcohol | Concentration of NaOH | Substitution |
|---|---|---|---|
| | | Per cent | |
| 2 | 785 | 30 | 1.18 |
| 3 | 702 | 18 | 0.89 |
| 4 | 702 | 12 | 0.73 |

EXAMPLE 5

Thirty parts of shredded sheet purified cotton linters was suspended in 526 parts of 87% isopropyl alcohol plus 196 parts of anhydrous isopropyl alcohol. The resulting slurry was agitated and 20 parts of an aqueous solution of sodium hydroxide in water was added. The concentration of the sodium hydroxide solution was 20%. Two parts of chloracetic acid dissolved in 8 parts of isopropyl alcohol was then added over a one-half hour period. The resulting mixture was heated to 55° C. in one hour and held at that temperature with agitation for five hours. The resulting fibrous product was then separated from the liquid medium by centrifuging, washed with methanol, and dried at 100° C. in air. It had a substitution of 0.11. It was insoluble in water but soluble in 5% aqueous sodium hydroxide solution at 0°–5° C.

EXAMPLE 6

This example gives the results of tests using various alcohols as reaction media and for purposes of comparison gives the results of tests using isopropyl alcohol under the same conditions. Procedures for carrying out the tests were generally similar to those hereinbefore described. The comparative results are shown in Table II below.

*Table II*

| Reaction Medium | Substitution Obtained | Substitution Which Isopropyl Alcohol Gives Under the Same Conditions | Water [1] Solubility |
|---|---|---|---|
| Methyl Alcohol | 0.16 | 0.9 | Insoluble. |
| Ethyl Alcohol | 0.35 | 0.9 | Do. |
| n-Propyl Alcohol | 0.38 | 0.65 to 0.70 | Few Fibers, Very Granular. |
| n-Butyl Alcohol | 0.61 | 0.9 | Very Few Fibers, Quite Granular. |
| Iso-Butyl Alcohol | 0.31 | 0.65 to 0.70 | Opaque Gel. |
| Sec-Butyl Alcohol | 0.37 | 0.65 to 0.70 | Do. |
| Tert.-Butyl Alcohol | 0.88 | 0.9 | Excellent. |
| Acetone | 0.39 | 0.65 to 0.70 | Almost Fiber Free, Quite Granular. |
| Dioxane | 0.45 | 0.65 to 0.70 | Do. |

[1] Two per cent aqueous solutions.

Example 6 shows the marked superiority both in efficiency and in maximum extent of substitution, obtained by the use of isopropyl alcohol and tertiary butyl alcohol as compared with the other alcohols tested. With the exception of the product obtained with tertiary butyl alcohol, the solution quality in all cases is definitely inferior to that which is obtained from products prepared with isopropyl alcohol under the same reaction conditions. Substitution values are from about 0.2 to 0.4 less than with isopropyl alcohol and tertiary butyl alcohol, if the unusually bad methyl alcohol is excluded. These results are indicative of a difference in behavior of the two alcohols mentioned and the other alcohols tested.

It has been found that isopropyl alcohol and tertiary butyl alcohol are unique in the process of this invention. The reasons for the successful results obtained with these alcohols are not clear, but it is believed that they combine substantial inertness toward the reactants with ability to take up water from the other reactants while maintaining a condition of nonsolvency for the product. Nonsolvency alone, however, is insufficient since it has been found that diluents such as hexane, which do not dissolve the product, do not prevent formation of a dough of the cellulose ether in the aqueous alkali present.

The isopropyl or tertiary butyl alcohol will be utilized in a quantity sufficient to prevent the product from going into solution in the reaction medium. This represents a minimum quantity. As a rule, somewhat more will be used to provide for free agitation of the mixture. An unlimited quantity can be used, subject only to the inconvenience of unnecessary dilution. In general, satisfactory ratios vary from five parts to 50 parts of the alcohol for each part of cellulose. A quantity of about 15 to 30 parts of alcohol per part of cellulose is preferred.

The alcohol may be in the anhydrous form as added or it may contain a certain amount of water; i. e., it may be in the form of the constant boiling mixture in which it is obtained on separation from water. It will be understood, of course, that if water is added in the alcohol, due allowance must be made therefor so that the reaction medium has the desired total water content. As a rule, the ratio of alcohol to water in the reaction system is greater than about 1.5 parts of alcohol per part of water.

The present invention is concerned with the preparation of any carboxyalkyl cellulose insoluble in the alcohols used as the reaction medium. The examples illustrate preparation of carboxymethylcellulose. Other carboxyalkyl ethers, such as carboxyethylcellulose, carboxypropylcellulose, carboxybutylcellulose, and substituted variations in the alkyl group of the ethers mentioned, are, for example, prepared in a similar fashion. It will be appreciated that the primary reaction product is usually the alkali-metal salt of the carboxyalkyl cellulose, since the reaction is carried out in a strongly alkaline medium. The free acid is, in each case, readily obtained by treating the primary product with a mineral acid. Other salts are readily prepared from the free acid.

The etherification agent illustrated in the examples is chloracetic acid, or more accurately sodium chloracetate, since the chloracetic acid is neutralized by free alkali upon addition to the reaction mixture. It may be added as the free acid or as a salt as desired, due allowance being made for the consumption or lack of consumption of alkali already present. Instead of chloracetic acid, other halogenated lower fatty acids, such as chlorpropionic acid, chlorbutyric acid, and salts thereof, with sodium, potassium, and the like, may be utilized. The corresponding bromine and iodine compounds are suitable but more expensive. The quantity of etherifying agent will be varied with the substitution desired in the product. In general, the etherifying agent will be used in a quantity between about 0.01 part and about 3.0 parts per part of cellulose. The proportion of etherifying agent to free alkali present may also be a factor in determining substitution. In most cases, it has been found preferable to have present about 0.5 mole to about 1.0 mole of etherifying agent per mole of free alkali.

The alkali present in the reaction is usually sodium hydroxide. However, any of the strong alkali hydroxides, including potassium hydroxide, are suitable. It will be appreciated that, where the etherifying agent is added in the form of free acid, alkali must be provided for neutralization of the acid above and beyond that required for bringing about the etherification reaction. The amount and concentration of alkali with respect to water are factors governing the substitution of the final product. Any amount of alkali may be used in the process of the present invention as long as a product insoluble in the medium is obtained. Ordinarily, the ratio of alkali (as sodium hydroxide) to cellulose varies from about 0.1 part to about 2.0 parts per part of cellulose. With respect to water, the ratio of alkali (as sodium hydroxide) to water usually varies from about 0.02 to about 1.0 part of sodium hydroxide per part of water. These ratios refer to free alkali above that consumed for neutralizing acid etherification agents.

The cellulose utilized in the reaction may be any reactive cellulose, such as chemically purified cotton linters, ramie fiber, or wood pulp. Cotton linters and 95% alpha-cellulose wood pulp are preferred raw materials.

The reaction may be carried out by merely mixing the ingredients in the etherification reaction medium. Usually, the cellulose is first suspended in the secondary or tertiary alcohol reaction medium, a solution of alkali is added, and the etherification agent is then added as a solid or dissolved in water or the medium. The reaction mixture is merely stirred until the desired reaction has been completed. Usually, the mixture is heated at some temperature between 25° and 100° C. to hasten the reaction. At temperatures of the order of 50°-75° C., a reaction time of two-six hours is usually sufficient. It will be noted that no special measures need be taken to prepare alkali cellulose. Mere addition of sodium hydroxide to the suspension in the reaction medium accomplishes the desired result. However, if desired, alkali cellulose can be prepared separately, as in many etherification reactions.

The product is recovered in a simple manner merely by draining off reaction medium or removing it more completely by centrifuging and then purifying the product in a nonsolvent, such as methanol or ethanol, which will leach out the by-products. Purification is quite simple, since the product is substantially in the same form as the raw material; i. e., usually in an open fibrous condition. Thus, for example, the fibrous reaction product is stirred in methanol or ethanol, free alkali is neutralized with acetic acid, and the mixture is then drained off and washed with additional methanol or ethanol. Usually, it is desirable to wash once with anhydrous methanol for the purpose of dehydrating the product. Simple air drying provides a dry material ready for shipment and use in a form which dissolves very readily.

What we claim and desire to protect by Letters Patent is:

1. In a process in which cellulose is reacted in the presence of strong alkali and water with a carboxyalkyl halide etherification agent to form a cellulose carboxyalkyl ether, the improvement which consists in carrying out the etherification reaction in a reaction medium comprising alcohol selected from the group consisting of isopropyl alcohol and tert.-butyl alcohol in an amount of at least 1.5 parts for each part of water present in the etherification reaction mixture and sufficient to maintain the cellulose ether formed in a solid, undissolved state throughout the reaction.

2. In a process in which cellulose is reacted in the presence of strong alkali and water with a carboxyalkyl halide etherification agent to form a cellulose carboxyalkyl ether, the improvement which consists in carrying out the etherification reaction in isopropyl alcohol in an amount of at least 1.5 parts for each part of water present in the etherification reaction mixture and sufficient to maintain the cellulose ether formed in a solid, undissolved state throughout the reaction.

3. In a process in which cellulose is reacted in the presence of strong alkali and water with a carboxyalkyl halide etherification agent to form a cellulose carboxyalkyl ether, the improvement which consists in carrying out the etherification reaction in tert.-butyl alcohol in an amount of at least 1.5 parts for each part of water present in the etherification reaction mixture and sufficient to maintain the cellulose ether formed in a solid, undissolved state throughout the reaction.

4. A process for preparing a carboxyalkyl ether of cellulose which comprises agitating cellulose, free alkali and water, and a carboxyalkyl etherifying agent in a quantity to etherify the cellulose in a reaction medium comprising alcohol selected from the group consisting of isopropyl alcohol and tert.-butyl alcohol in an amount of at least 1.5 parts for each part of water present in the etherification reaction mixture and sufficient to maintain the product formed in an undissolved state until the cellulose becomes etherified, and recovering the resulting ether.

5. A process for the preparation of carboxymethylcellulose which comprises suspending cellulose in an alcohol selected from the group consisting of isopropyl alcohol and tert.-butyl alcohol in a quantity sufficient to prevent solution of the cellulose ether formed in the reaction, adding free alkali and water and a chloracetic etherifying agent, said alcohol being present in an amount of at least 1.5 parts for each part of water present in the etherification reaction mixture, heating the resulting mixture until the cellulose is etherified, and recovering the resulting ether.

6. A process for the preparation of carboxymethylcellulose which comprises suspending cellulose in isopropyl alcohol in a quantity sufficient to prevent solution of the cellulose ether formed in the reaction, adding free alkali and water and a chloracetic etherifying agent, said alcohol being present in an amount of at least 1.5 parts for each part of water present in the etherification reaction mixture, heating the resulting mixture until the cellulose is etherified, and recovering the resulting ether.

7. A process for the preparation of carboxymethylcellulose which comprises suspending cellulose in tert.-butyl alcohol in a quantity sufficient to prevent solution of the cellulose ether formed in the reaction, adding free alkali and water and a chloracetic etherifying agent, said alcohol being present in an amount of at least 1.5 parts for each part of water present in the etherification reaction mixture, heating the resulting mixture until the cellulose is etherified, and recovering the resulting ether.

8. A process for the preparation of carboxymethylcellulose which comprises suspending cellulose in isopropyl alcohol in a quantity sufficient to prevent solution of the cellulose ether formed in the reaction, adding sodium hydroxide and water and sodium chloracetate, said alcohol being present in an amount of at least 1.5 parts for each part of water present in the etherification reaction mixture, heating the resulting mixture at 25°–100° C. until the cellulose is etherified, and recovering the resulting ether.

9. A process for the preparation of carboxymethylcellulose which comprises suspending cellulose in tert.-butyl alcohol in a quantity sufficient to prevent solution of the cellulose ether formed in the reaction, adding sodium hydroxide and water and sodium chloracetate, said alcohol being present in an amount of at least 1.5 parts for each part of water present in the etherification reaction mixture, heating the resulting mixture at 25°–100° C. until the cellulose is etherified, and recovering the resulting ether.

EUGENE D. KLUG.
JOHN S. TINSLEY.

REFERENCES CITED

The following references are of record in the file of this patent:

UNITED STATES PATENTS

| Number | Name | Date |
|---|---|---|
| 1,682,294 | Lilienfeld | Aug. 28, 1928 |
| 2,110,526 | Lorand | Mar. 8, 1938 |
| 2,137,343 | Maxwell | Nov. 22, 1938 |
| 2,170,009 | Clarke et al. | Aug. 22, 1939 |
| 2,236,523 | Coolidge | Apr. 1, 1941 |
| 2,236,545 | Maxwell et al. | Apr. 1, 1941 |